INVENTORS
CHARLES ROBERT BONNELL
KENNETH L. McMILLEN
BY
Hopgood & Calimafde
ATTORNEYS

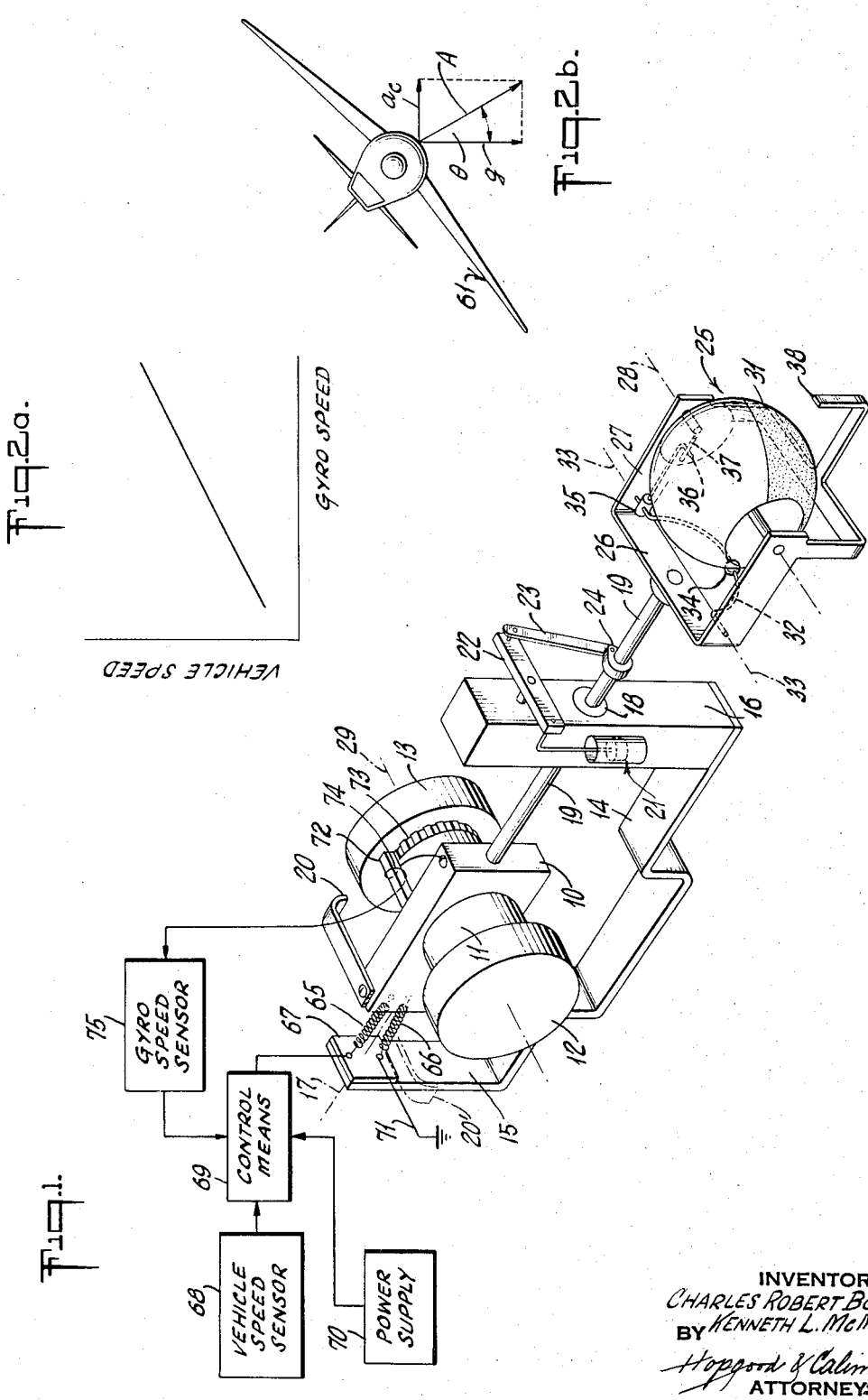

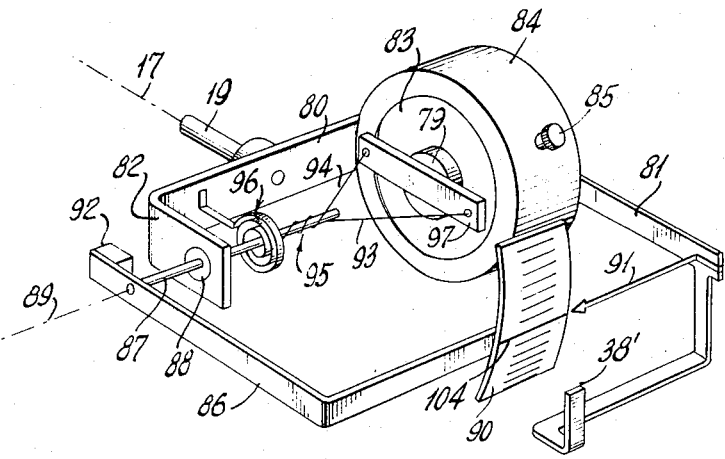
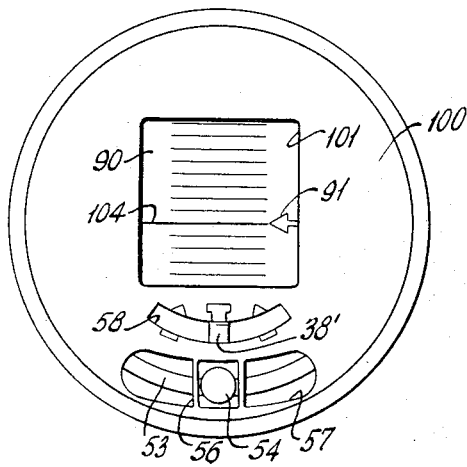
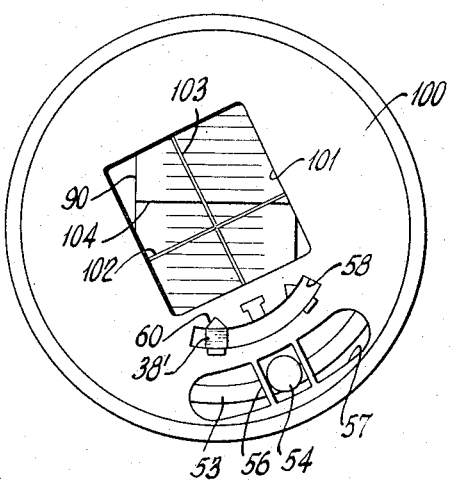

United States Patent Office

3,357,242
Patented Dec. 12, 1967

3,357,242
ROLL-STABILIZED PLATFORM
Charles Robert Bonnell and Kenneth L. McMillen, Wichita, Kans., assignors to Electronic Communications, Inc., a corporation of New Jersey
Filed Apr. 11, 1966, Ser. No. 541,659
9 Claims. (Cl. 73—178)

ABSTRACT OF THE DISCLOSURE

The invention utilizes a non-pendulous single-axis gyro for effectively "roll-stabilizing" an instrument platform, with respect to the frame of a moving vehicle. The gyroscope is mounted to the platform with its spin axis substantially perpendicular to the roll axis. The platform is torsionally compliantly restrained with respect to the frame and about the roll axis in opposition to the precession torque of the gyroscope about the roll axis (due to such turning as the vehicle makes about the input axis, i.e., about an axis perpendicular to the gyroscope-spin axis and to the roll axis). The gyroscope is spun at a rate proportioned to the vehicle velocity component along the roll axis.

---

Our invention relates to an improved roll-stabilized platform and method, for use in a moving vehicle such as an airplane, and having particular use in aircraft and the like instrumentation.

Aircraft instrumentation today leaves much to be desired in the area of simplicity, effectiveness and reliability, particularly as it applies to smaller aircraft under conditions requiring instrument navigation. For example, the roll-stable platform required for much of such instrumentation ordinarily involves a gyro with two degrees of freedom (or two gyros each having a single degree of freedom), and no reliable one-gyro single-degree-of-freedom system exists for the purpose.

It is accordingly an object of the invention to provide an improved roll-stabilized platform and method employing one gyro with a single degree of freedom, and to provide improved instrumentation utilizing the same.

Another object is to meet the above object with mechanism that is inherently simple and to the greatest extent direct-acting.

A further object is to provide improved and simplified instrumentation which is inherently direct-reading in terms of rate of vehicle turn, in a coordinated turn situation.

Still another object is to provide simplified instrumentation which is inherently direct-reading in terms of rate of ascent or descent.

A specific object is to provide an improved gyro-controlled roll-stabilized platform in which the input axis is maintained substantially in the instantaneous vertical plane of the flight path, so that substantially instantaneous roll conditions are directly available.

It is a general object to achieve the foregoing objects with instrumentation that is relatively inexpensive, reliable, and which has inherent utility over a range of speeds in which the vehicle is expected to execute turns and changes in altitude.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIG. 1 is a simplified view in perspective schematically showing the functional interrelation of parts in one embodiment of the invention;

FIG. 2a is a graph depicting the relationship between flight speed (air speed) and gyro (spin) speed in the embodiment of FIG. 1;

FIG. 2b is a vector diagram to explain operation of the embodiment of FIG. 1;

FIG. 8 is a fragmentary view similar to FIG. 1 but illustrating another embodiment;

FIG. 9 is a view of a display panel for the embodiment of FIG. 8; and

FIG. 10 is a view similar to FIG. 9 to illustrate a modification.

Figure 3:
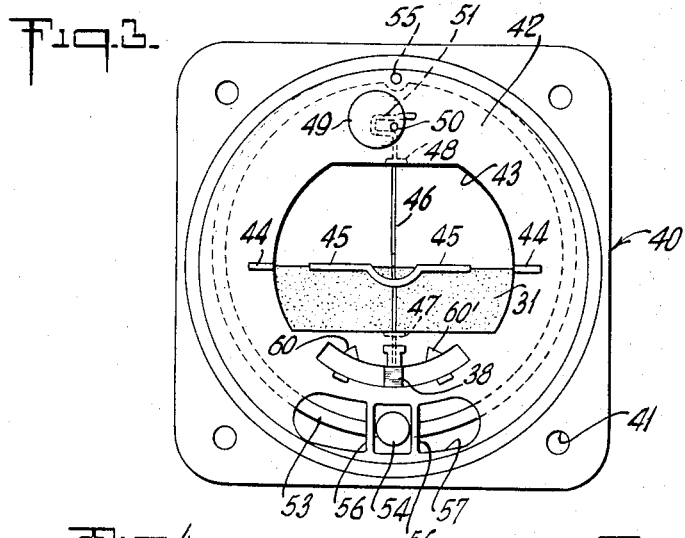
FIG. 3 is a front view of a display panel for use with the embodiment of FIG. 1.

Briefly stated, the invention contemplates utilizing a single-axis gyro (i.e., a gyroscope having a single degree of freedom) for roll-stabilizing an instrument platform, with respect to the frame of a moving vehicle. The gyroscope is non-pendulous, being mounted to the platform with its spin axis substantially perpendicular to the roll axis. The platform is torsionally compliantly restrained with respect to the frame and about the roll axis in opposition to the precession torque of the gyroscope about the roll axis (due to such turning as the vehicle makes about the input axis, i.e., about an axis perpendicular to the gyroscope-spin axis and to the roll axis). The gyroscope is spun at a rate proportioned to the vehicle velocity component along the roll axis.

In terms of an aircraft instrument in which the platform is desirably horizontally stabilized, the spin axis is nominally horizontal and transverse to the vehicle axis; by "horizontally stabilized" it is meant that the spin axis of the gyro is maintained in a horizontal plane. The torsional spring action is such as to apply restoring torque about the roll axis in the direction of a "centered" relationship between the frame and the platform about the roll axis. In order to assure a correct desired magnitude of such restoring torque, even in the presence of a turning maneuver, pendulum techniques enable symmetrical orientation of the vehicle with respect to the instantaneous resultant acceleration vector. In one form to be described, we provide a true indication of roll (rate of turn), in a coordinated-turn maneuver; in another form, we provide a true indication of rate of change of altitude, substantially independent of lateral and longitudinal acceleration components. Both these indications may be provided regardless of the instantaneous velocity of the vehicle, over the full expected range of flight speeds.

Referring to FIG. 1 of the drawings, the invention is shown in application to a roll-stabilized platform exemplified by the mounting or gimbal 10 for a single-axis gyroscope, shown to comprise electric-motor drive means 11 and two rotary inertial masses 12–13 perpendicular to and symmetrically positioned with respect to the roll axis. The instrument frame is symbolized by an elongated bracket 14 connecting spaced uprights 15–16 through which the roll axis 17 passes. Bearing means 18 in upright 16 supports and orients a pivot shaft 19 on the roll axis, and in the form shown shaft 19 is fixed to and may therefore be viewed as part of the gimbal 10. Suitable mechanical stops may be provided to assure against excessive roll freedom of platform 10 with respect to the frame; in FIG. 1, an offset or arm 20 carried by platform 10 will interfere with bracket 14 should the frame roll more than say 95° counterclockwise (in the sense of FIG. 1), and it will be understood that the equivalent stop arm 20' for limiting clockwise rotation beyond say 95° is merely shown in phantom outline, for clarity in the drawing. Sudden roll displacements of the parts are resisted by action of a dash-pot 21 mounted on one side of upright 16 and connected by a rocker arm 22 and a link 23 to a suitable pin location 24 carried by and slightly offset from the roll shaft 19; it will be appreciated that the small eccentric offset of pin 24 (with respect to the roll axis 17), compared to the relatively large effective radius of link connections to rocker arm 22, enables dash-pot action to characterize the full ±95° roll freedom of gimbal 10 with respect to the frame.

In the form shown in FIG. 1, the platform or gimbal 10 supports or carries instrumentation designated generally 25. This instrumentation, in conjunction with frame-referenced display parts to be described in connection with FIG. 3, is inherently capable of enabling co-ordinated turn maneuvers of any desired rate and for a range of flight speeds.

For purposes of support, the gimbal or platform 10–19 includes a yoke 26 secured to shaft 19 and having two spaced arms 27 which establish a pivot axis 28 parallel to the spin axis 29 of the gyroscope system 11–12–13. A pivot shaft 30 supports a horizon ball 31 on axis 28, the ball 31 being shown with a laterally extending "horizon" demarcation against which a frame-referenced horizon display is to be interpreted. To properly erect the ball 31 in accordance with instantaneous pitch (of the roll axis 17) we show a pendulum in the form of a bail 32, depending from spaced pivot supports in arms 27, and freely pivotable about an axis 33; a suitable mass 34 at the bottom of bail 32 loads the pendulum. Pendulum swing is translated to ball 31 through reversing mechanism comprising a crank 35 secured to bail 32 and having an offset-pin end 36 which rides a radial slot 37 in the base end of ball 31. To complete the description of parts carried by the platform or gimbal 10, we show a pointer element 38 fixed to an arm 27 and extending essentially vertically, at a location that is central between arms 27 and which may be in closely spaced proximity to the adjacent surface of ball 31.

The indicator panel for the instrument of FIG. 1 is shown in FIG. 3. This comprises a casing or frame 40 with means 41 for securing the same to the instrument panel of an aircraft. Behind protective glass (not shown) a face plate 42 is pierced with a truncated circular opening or horizon window 43 through which a part of the horizon ball 31 is visible; it happens to be shown perfectly oriented with respect to spaced horizontal reference marks 44 on plate 42, as in straight level flight. For the loaded condition of the airplane in which straight level flight involves a slight incidence of the airframe or roll axis 17 with respect to the true level flight path, we provide an adjustable centrally located horizon-reference marker 45, carried by a vertical rod 46, which in turn is guided by in-turned lugs 47–48 struck out of the plate 42; marker 45 is vertically adjustable by the action of a manual knob 49 with an offset crank pin 50 riding a suitable "slot" formation 51 at the upper end of rod 46.

A further pendulum establishes display of the instantaneous resultant acceleration vector, in the plane perpendicular to the roll axis 17. In the form shown, this pendulum is a ring-shaped stamping 53 carrying a suitable circular indicator element 54 at its lower end, the upper end being pivoted at 55 to the frame 40 and behind plate 42. Centered limit markers 56 in another pierced window 57 in plate 42 permit accurate observation of the centered condition of pendulum 53, as will be understood.

The third pierced window 58 in plate 42 is located between windows 43–57 and is arcuate about the roll axis 17 which can conveniently coincide with the center of plate 42. Window 58 permits direct-viewing of pointer 38, against a centered marker 59 and against angularly offset markers 60–60'. Under conditions to be described, the angular positioning of pointer 38 in window 58 is a direct measure of roll (rate of turn), in a turning maneuver of of the aircraft, and marks 60–60' may be located to identify a desired standard turn rate, such as 180° per minute, left or right, as the case may be.

A fundamental principle of the instrument of FIG. 1 may be appreciated by reference to FIG. 2b, which shows forces at work during a banked turn of an aircraft 61. The forces acting include a 1-$g$ vertical force $g$ due to earth gravitation, and a centrifugal-acceleration force $a_c$ due to centrifugal force reflecting tightness of the turn and flight speed. The resultant A is the vector sum, which will be perfectly centered on (or parallel to) the vertical axis of the airplane, in a perfectly coordinated turn, it being noted that FIG. 2b depicts a slight departure from such perfect coordination. Under perfectly coordinated turn conditions, the resultant acceleration vector A will assume the true bank (or roll angle) of the aircraft, and in the instrument of FIG. 1 this condition is noted when pendulum 53 is perfectly centered at 54–56. This is the situation depicted in FIG. 4.

To be able to display a true roll (turn-rate) indication at 38–58, the gyro mechanism 11–12–13 is caused to exhibit a long-term stabilization effect conforming to the expression:

$$\theta = \tan^{-1} \frac{V\omega}{g}$$

where $\theta$ is, as indicated, the bank angle of the airplane in a coordinated turn at $\omega$ radians per second, at flight velocity V. This expression is derived by noting, in connection with FIG. 2b, that:

(a)     Centrifugal acceleration $(a_c) = R\omega^2$ where R is the radius of the turn maneuver; and (b)     Flight velocity in the turn $(V) = R\omega$ So that centrifugal acceleration may also be stated:

(c)     $a_c = V\omega$

By inspection, then, $$\tan \theta = \frac{V\omega}{g}$$

and (d)     $\theta = \tan^{-1} \frac{V\omega}{g}$, or $\omega = \frac{g \tan \omega}{V}$ which is the long-term stabilization output of the gyro mechanism.

Now, in a turning maneuver, the gyro 11–12–13 will react by precessing (about the roll axis) in proportion to the turn rate $\omega$, but in the sense opposite to the roll (bank) which effects the turn. In order to offset this precessing torque we provide a suitable compliant connection between the platform 10 and the frame 14, establishing a centering or restoring torque against which the precessing torque develops an equilibrium condition when the pointer 38 indicates (at 58) the true instantaneous bank angle $\theta$. Stated in other words, the platform or gimbal 10 is held horizontal and is truly a horizontally stabilized (i.e., roll-stabilized) platform.

In the form shown, the restoring torque is provided by coil springs 65–66, symmetrically positioned with respect to each other about the roll axis 17 and connecting opposed faces of gimbal 10 and a terminal block 67 forming part of upright 15. The net restoring torque T which characterizes the compliant connections 65–66 is given by the expression:

(e)     $$T = k\theta, \text{ or } k = \frac{T}{\theta}$$

where $k$ is the spring rate of restoring torque. Realizing that gyro-precessing torque is related to $\omega$ times a function of gyro-spin rate H, expression (e) becomes:

(f)     $$k = \frac{\omega \times f(H)}{\theta}$$

and recalling the nature of ω from expression (d) above, expression (f) becomes:

(g) $$k = \frac{g \times f(H)}{V}\left(\frac{\tan \theta}{\theta}\right)$$

for a given velocity relation (i.e., airspeed and gyro-speed).

Thus, for small angles of θ, the spring rate $k$ should be fairly constant, but as the roll angle increases the spring rate must increase at an even faster rate. In other words, (1) as long as gyro-spin rate is directly related to flight speed, (2) as long as the resultant acceleration vector A is correctly centered at 54–56, and (3) as long as the spring rate of restoring torque follows expression (g), the gimbal 10 will be roll-stabilized.

As indicated, the restoring torque necessary to offset gyro-precessing torque as a function of gyro input (turn rate) desirably follows the expression (g) above. This can of course be achieved by utilizing electromagnetic stalled-torque techniques reacting between the frame 14 and the gimbal 10 or its shaft 19, the stalled torque magnitude being pre-characterized as a function of the angle θ. However, an adequate approximation of such characterized offsetting torque may be achieved by coil springs, secured in their connections to the gimbal and the frame, as shown at 65–66, said springs being initially prestressed in tension for the "centered" position of gimbal 10; such springs 65–66 effectively exhibit an ever-increasing spring rate, as the angle θ (of frame rotation about gimbal 10) increases in either direction away from the "centered" position. Actually, the build-up of spring rate is attributable to combined effects of complex cantilever bending, added stretch, and twisting as they occur in springs 65–66, symmetrically about the roll axis 17.

For many types of airplanes, such as the smaller private craft, most flying is done at a reasonably consistent "cruising" flight speed, so all requirements are adequately met by designing the proper constant-speed drive for gyro rotation, the springs 65–66 being used to transfer electrical circuit connections from the airframe to the stabilized platform 10. On the other hand, other aircraft may normally fly at more widely differing speeds, in which case we provide appropriate variable speed drive to the gyro-spin motor 11. In FIG. 1, this variable-speed drive is suggested by a vehicle-speed sensor 68 which may be a differential pressure signal generator producing an electrical output reflecting instantaneous difference between pitot and static pressures. This signal operates on control means 69 to control supply of power from a source 70 to one side of the line to motor 11, the other side being shown grounded at 71. The direct relation of air-speed to gyro-speed is suggested in FIG. 2a. To assure accurate gyro-speed control a pick-off element 72 is carried by gimbal 10 and is poised to sense driven speed of gyro motor 11. In the form shown, element 72 forms part of a permanently magnetized circuit which also includes the fluted periphery of a ferromagnetic wheel 73 on the shaft of motor 11. The flutings cause fluctuations in the reluctance of the air gap to element 72, at a frequency reflecting gyro-speed. A pick-off coil 74, linked to element 72 thus develops a varying voltage at such frequency, and this can be utilized as a feed-back control circuit 69, employing a gyro-speed sensor circuit 75 to produce a D-C or other feed-back-control voltage reflecting instantaneous sensed gyro-speed.

Figure 4:
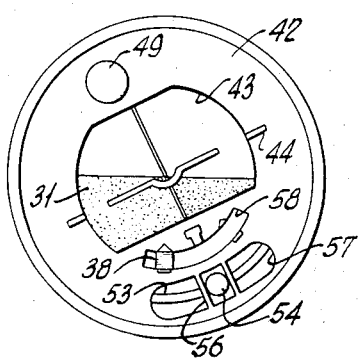
FIGS. 4 to 7 are similar simplified views of the panel display of the instrument of FIGS. 1 and 3, for different flight conditions.

To further illustrate use of our instrument of FIG. 1, the diagram of FIG. 4 illustrates stabilization of the gimbal 10 in the horizontal, for a coordinated left turn of 180° per minute. To come out of the turn and into straight flight, the recovery involves pulling the right wing down.

Figure 5:
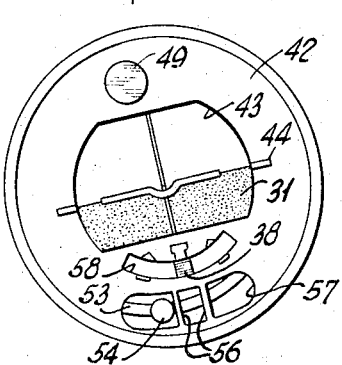

In FIG. 5, the display shows a straight-flight situation, with the left wing low—a slip condition. To recover, the pilot should retrim his aileron and rudder controls.

Figure 6:
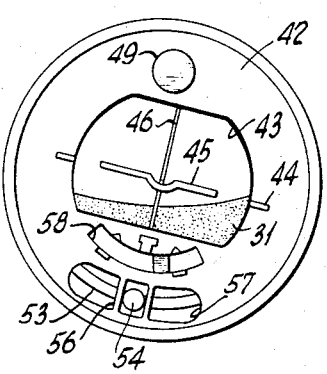

In FIG. 6, the display shows a right coordinated turn and a climb. The recovery involves a lowering of the left wing. If at "cruise" power, forward pressure should be applied to the "stick"; if on "climb-out" power, this should be reduced to "cruise" power.

Figure 7:
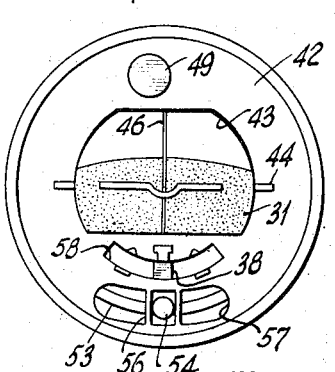

FIG. 7 shows a dive condition. It should be noted that, because of the pendulum 32–34, sudden reductions of power when straight and level will also produce this indication; similarly, the application of wing flaps will produce a like change in the pitch indication, usually to indicate a dive. To recover, the "stick" should be pulled back, and power should be added if the airplane is in slow-speed descent.

The embodiment of FIG. 8 depicts an instrument useful with the roll-stabilized platform 10 (of FIG. 1) to provide a direct-reading indication of rate of change of altitude, i.e., ascent or descent, independent of pitch angle. The FIG. 8 device comprises a yoke 80 secured to the stable platform shaft 19 and providing spaced elongated support arms 81–82. The arm 81 carries a differential-pressure sensing device such as a diaphragm 83, sealing off one side of a chamber 84 having a bleed orifice 85 (which is preferably adjustable) to permit air pressure within chamber 84 to follow with slight delay any changes in pressure on the outer face of diaphragm 83. A low-mass connecting element 79 carried at the center of diaphragm 83 provides a means for detecting diaphragm displacements, which of course are indicative of rate of change of altitude. Thus, in a descending situation, static or ambient pressure rises faster on the outer face than on the inner face of diaphragm 83, producing inward displacement to an extent reflecting rate of descent; for ascending situations, static pressure drops faster outside diaphragm 83 than it does in chamber 84, to produce an outward displacement of the diaphragm to an extent reflecting rate of ascent. These diaphragm displacements are translated into rotational indicating movement of an indicator element 86, shown pivotally supported on a shaft 87 having bearing support at 88 in arm 82; the axis 89 of shaft 87 is preferably parallel to the gyro-spin axis 29. In the form shown, indicator arm 86 carries a suitably graduated panel 90 to be moved against a non-rotated cooperating reference mark, suggested by the arrow pointer 91 which is fixed to arm 81. A counter weight 92 on arm 86 helps to control the inertial response of arm 86 to pitching transients; preferably, the mass 92 is insufficient to completely balance the arm 86 (about axis 89), so that a sudden lift or drop can be inertially detected and displayed, in anticipation of the ascent or descent rate to be detected by diaphragm 82.

The preferred anti-backlash linkage connecting diaphragm 83 to shaft 87 is of a variety shown and described in greater detail in copending patent application Serial No. 455,371, filed May 13, 1965. Accordingly, like cords or filaments of flexible material 93–94 are connected at spaced-apart points on a low-mass beam 97 attached to the center of diaphragm 83, their other ends (at 95) being secured to and wrapped around and along the adjacent projecting end of shaft 87, being lightly torsionally loaded into this relation by a hair spring 96, referenced to the bracket 80. The preload of hair spring 96 is preferably such as to accommodate the full extent of possible diaphragm displacement, as will be understood.

It will be appreciated that in descent situations, outward displacement of diaphragm 83 will be reflected in upward movement of the indicator arm 86 and indicator panel 90, showing against arrow 91 the magnitude of rate of descent. Similarly, ascent rate is interpreted by reading arrow 91 against the graduations on the upper half of panel 90.

In FIGS. 9 and 10, I show alternative display faces for use with the self-stabilized instrumentation of FIG. 8. In FIG. 9, the instrument plate 100 is cut with a window opening 101 for the viewing of panel 90 and arrow 91. Both the turn-rate display and the resultant-acceleration vector orientation display will be recognized as similar to that of FIG. 3, so that the same reference characters are repeated, where applicable. The display of FIG. 9 happens to depict straight, level flight, without change in altitude.

In FIG. 10, the display is generally similar but the arrow 91 is dispensed with, in favor of quadrature crosshairs carried by plate 100 and dividing the window opening 101. The situation depicted is a descending turn to the left, in which the resultant-acceleration vector is centered at 54–56, to identify a coordinated turn. The intersection of cross-hairs 102–103 below the level-flight line 104 indicates a descending condition, at a rate represented by two subdivisions below the level-flight line 104. The turn rate displayed by needle 38' against marker 60 indicates 180° per minute in a coordinated turn.

Throughout the foregoing description, we have assumed, for purposes of clarity, that the roll axis 17 of gimbal 10 substantially coincides with the vehicle axis in straight and level flight. Actually, this need not necessarily be so and in some cases is not desirably so. For example, the adjustment knobs 49 provides for setting the horizon for small departures of the vehicle axis from the gyro-roll axis 17, all in the same vertical plane however. It will be appreciated that in still further cases, as for example, airplanes having slow response to turn control, the roll axis 17 of the gyro system should be deliberately inclined in the vertical plane of symmetry of the vehicle, so that a wing dip (which might ordinarily precede turn execution, by several seconds delay) can be immediately interpreted and displayed as a roll, in anticipation of the slow aerodynamic response of the vehicle to the turn that is called for.

It will be seen that we have described improved flight instrumentation as well as an improved roll-stabilization method for use in implementing such instrumentation. The technique affords extreme simplicity, ruggedness, and lends itself to relatively low-cost fabrication. Instrument-navigated and automatic flight are rendered simpler for the private-airplane pilot.

It will also be understood, for example, that reference to flight as an aircraft term is merely illustrative of the path of the particular vehicle involved, because the invention has applicability toother types of vehicles, such as submarines.

While we have described the invention in detail for the preferred forms shown, it will be understood that modifications may be made within the scope of the invention as defined by the claims which follow.

We claim:
1. A roll-stabilizable platform for a flight instrument or the like, comprising a frame including bearing means adapted for fixed orientation with the bearing axis in a plane passing through and substantially aligned with the flight axis; non-pendulous gyroscope means having a single degree of freedom and including a gimbal pivotally supported by said bearing means, a variable-speed electric motor and a rotary inertial mass journaled for continuous rotation in said gimbal, said bearing axis being perpendicular to the axis of inertial-mass rotation; vehicle-speed sensing means connected to control the speed of said motor in accordance with sensed vehicle speed; frame-referenced centering means connected to said gimbal to supply restoring torque urging to a centered orientation the axis of inertial-mass rotation, the restoring torque of said centering means being such as to substantially balance the gyro-precession torque with a balancing torque directly proportional to the angle by which the gimbal and frame depart from the centered orientation, the pivotal support of said gimbal providing gimbal freedom with respect to the frame for relative rotation comprehending at least the anticipated range of bank attitudes with respect to said centered orientation, the centered reference of said centering means to the frame being such as to establish a horizontal orientation for the axis of inertial-mass rotation when in straight flight, said centering means including two electrically conductive spring elements in electrically insulated relation to each other and symmetrically preloading said gimbal to the centered orientation, said spring elements forming part of said means connected to control motor speed in accordance with sensed vehicle speed; and support means for an instrument or the like carried by said gimbal and constituting a roll-stabilizable platform, said platform utilizing said gyroscope means as its only gyroscopic stabilizing means; whereby when banking in substantially level flight at a bank angle substantially normal to the instantaneous acceleration vector, said platform is essentially roll-stabilized.

2. Instrument means for a flying vehicle, comprising a frame including bearing means adapted for fixed orientation, with the bearing axis in a plane passing through and substantially aligned with the flight axis; non-pendulous gyroscope means having a single degree of freedom and including a gimbal pivotally supported by said bearing means, a variable-speed electric motor and a rotary inertial mass journaled for continuous rotation in said gimbal, said bearing axis being perpendicular to the axis of inertial-mass rotation; vehicle-speed sensing means connected to control the speed of said motor in accordance with sensed vehicle speed; frame-referenced centering means connected to said gimbal to supply restoring torque urging to a centered orientation the axis of inertial-mass rotation, said gimbal providing gimbal freedom with respect to the frame for relative rotation comprehending at least the anticipated range of bank attitudes with respect to said centered orientation, the centered reference of said centering means to the frame being such as to establish a horizontal orientation for the axis of inertial-mass rotation when in straight flight, said centering means including two electrically conductive spring elements in electrically insulated relation to each other and symmetrically preloading said gimbal to the centered orientation, said spring elements forming part of said means connected to control motor speed in accordance with sensed vehicle speed; and an instrument including a part carried by said frame and a part carried by said gimbal, the part carried by said frame including pendulum means responsive to the instantaneous resultant acceleration vector of the frame with respect to earth, and the part carried by said gimbal including roll-indicative means responsive to instantaneous inclination of said gimbal about the pivot axis with respect to said centered orientation, and coordinated display means for effectively simultaneously displaying (a) the instantaneous roll deviation from said centered orientation and (b) the instantaneous direction of said vector in a plane generally transverse to said pivot axis; whereby turn rate in flight is directly readable from the displayed roll deviation as long as the flight attitude is trimmed to accord symmetrically with respect to the display of said vector direction.

3. Instrument means for a flying vehicle, comprising a frame, including bearing means adapted for fixed orientation, with the bearing axis in a plane passing through and substantially aligned with the flight axis; gyroscope means having a single degree of freedom and including a gimbal pivotally supported by said bearing means, a motor and a rotary inertial mass journaled for continuous rotation in said gimbal, said bearing axis being perpendicular to the axis of inertial-mass rotation; vehicle-speed sensing means connected to control the speed of said motor in accordance with sensed vehicle speed; frame referenced centering means connected to said gimbal to supply restoring torque urging to a centered orientation the axis of inertial-mass rotation, said gimbal providing gimbal freedom with respect to the frame for relative rotation comprehending at least the anticipated range of bank attitudes with respect to said centered orientation, the centered reference of said centering means to the frame being such as to establish a horizontal orientation for the axis of inertial-mass rotation when in straight flight; pendulum means pivotally supported by said gimbal on an axis parallel to the spin-rotation axis of said gyroscope means; and indicator means coacting between the frame and said pendulum means to display instantaneous relative angular orientation of said pendulum means with respect to the last-defined pivot axis.

4. Flight-instrument means according to claim 3, in which said indicator means further includes means displaying instantaneous relative angular orientation of said pendulum means with respect to said frame.

5. Instrument means for a flying vehicle, comprising a frame including bearing means adapted for fixed orientation, with the bearing axis in a plane passing through and substantially aligned with the flight axis; gyroscope means having a single degree of freedom and including a gimbal pivotally supported by said bearing means, a motor and a rotary inertial mass journaled for continuous rotation in said gimbal, said bearing means being perpendicular to the axis of inertial-mass rotation; vehicle-speed sensing means connected to control the speed of said motor in accordance with sensed vehicle speed; frame-referenced centering means connected to said gimbal to supply restoring torque urging to a centered orientation the axis of inertial-mass rotation, said gimbal providing gimbal freedom with respect to the frame for relative rotation comprehending at least the anticipated range of bank attitudes with respect to said centered orientation, the centered reference of said centering means to the frame being such as to establish a horizontal orientation for the axis of inertial-mass rotation when in straight flight; a differential-pressure detector carried by said gimbal and including a flexible diaphragm; a sealed chamber closed on one side by said diaphragm, and bleed means communicating between the air spaces on opposite sides of said diaphragm; and indicator means pivotally supported by said gimbal on an axis parallel to the spin-rotation axis of said gyroscope means, said indicator means including a drive connection to said diaphragm and responsive to diaphragm position.

6. Flight-instrument means according to claim 5, in which the inertial mass of said indicator means about its axis of suspension is such as to instantaneously respond to and indicate ascent and descent in accordance with flight changes in altitude, whereby displayed changes in altitude are independent of lateral and longitudinal acceleration components.

7. Flight-instrument means according to claim 5, in which the pivotally supported part of said indicator means includes a display element offset from the pivotal axis thereof and including an indicator mark extending generally parallel with the indicator axis, and further indicator means carried by the frame in registration with said indicator mark for interpreting roll from angular deviations about the axis of said pivot means and rate of change of altitude from angular deviations about the indicator-pivot axis.

8. Flight-instrument means according to claim 5, in which the pivotally supported part of said indicator means includes a display element offset from the pivotal axis thereof and including an indicator mark extending generally parallel with the indicator axis, and further indicator means carried by said gimbal in registration with said indicator mark for interpreting rate of change of altitude from angular deviations about the indicator-pivot axis.

9. Instrument means for a flying vehicle, comprising a frame including bearing means adapted for fixed orientation, with the bearing axis in a plane passing through and substantially aligned with the flight axis; non-pendulous gyroscope means having a single degree of freedom and including a gimbal pivotally supported by said bearing means, a motor and a rotary inertial mass journaled for continuous rotation in said gimbal, said bearing axis being perpendicular to the axis of inertial-mass rotation; vehicle-speed sensing means connected to control the speed of said motor in accordance with sensed vehicle speed; frame-referenced centering means connected to said gimbal to supply restoring torque urging to a centered orientation the axis of inertial-mass rotation, said gimbal providing gimbal freedom with respect to the frame for relative rotation comprehending at least the anticipated range of bank attitudes with respect to said centered orientation, the centered reference of said centering means to the frame being such as to establish a horizontal orientation for the axis of inertial-mass rotation when in straight flight; and a single multiple-display instrument including a first component comprising a part carried by said frame and a part carried by said gimbal, the part carried by said frame including pendulum means responsive to the instantaneous resultant acceleration vector of the frame with respect to earth, and the part carried by said gimbal including roll-indicative means responsive to instantaneous inclination of said gimbal about the pivot axis with respect to said centered orientation, and coordinated display means for effectively simultaneously displaying (a) the instantaneous roll deviation from said centered orientation and (b) the instantaneous direction of said vector in a plane generally transverse to said pivot axis; whereby turn rate in flight is directly readable from the displayed roll deviation as long as the flight attitude is trimmed to accord symmetrically with respect to the display of said vector direction; said instrument further including a second component comprising second pendulum means pivotally supported by said gimbal on an axis parallel to the spin-rotation axis of said gyroscope means; said coordinated display means further including an indicator coacting between the frame and said second pendulum means to display instantaneous relative angular orientation of said second pendulum means with respect to the last-defined pivot axis; whereby from said second component and its display, the vehicle's flight may be evaluated and flown substantially level, so that turn-coordination through evaluation of said first component may be under level-flight conditions.

References Cited

UNITED STATES PATENTS

| | | | |
|---|---|---|---|
| 1,433,102 | 10/1922 | Sperry | 33—204 |
| 1,660,152 | 2/1928 | Colvin | 33—204 |
| 2,315,019 | 3/1943 | Samuelson | 74—5.7 |
| 2,608,869 | 9/1952 | Thompson | 74—5.7 |
| 2,786,357 | 3/1957 | Quermann et al. | 74—5.7 |
| 3,187,587 | 6/1965 | Hurlburt | 74—5.7 |
| 3,250,497 | 5/1966 | Glass | 244—78 |

FOREIGN PATENTS 129,307 1919 Great Britain.

LOUIS R. PRINCE, *Primary Examiner.*

NEIL B. SIEGEL, *Assistant Examiner.*